(12) United States Patent
Eneboe et al.

(10) Patent No.: US 7,002,926 B1
(45) Date of Patent: Feb. 21, 2006

(54) ISOCHRONOUS SWITCHED FABRIC NETWORK

(75) Inventors: Michael K. Eneboe, San Jose, CA (US); Andrew D. Hospodor, Los Gatos, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 757 days.

(21) Appl. No.: 09/728,624

(22) Filed: Nov. 30, 2000

(51) Int. Cl.
  *H04L 12/28* (2006.01)

(52) U.S. Cl. .................. 370/255; 370/351; 370/406

(58) Field of Classification Search ............... 370/351, 370/400, 255, 230, 406
See application file for complete search history.

(56) References Cited

U.S. PATENT DOCUMENTS

| | | | |
|---|---|---|---|
| 4,673,013 A | | 1/1987 | Nakamura |
| 5,157,654 A | | 10/1992 | Cisneros |
| 5,291,482 A | | 3/1994 | McHarg et al. |
| 5,297,138 A | | 3/1994 | Black |
| 5,297,262 A | | 3/1994 | Cox et al. |
| 5,444,700 A | | 8/1995 | Martikainen et al. |
| 5,483,522 A | * | 1/1996 | Derby et al. ............. 370/400 |
| 5,485,578 A | | 1/1996 | Sweazey |
| 5,521,928 A | | 5/1996 | Worsley et al. |
| 5,566,169 A | | 10/1996 | Rangan et al. |
| 5,581,703 A | | 12/1996 | Baugher et al. |
| 5,612,897 A | | 3/1997 | Rege |
| 5,727,157 A | | 3/1998 | Orr et al. |
| 5,835,720 A | | 11/1998 | Nelson et al. |
| 5,926,101 A | | 7/1999 | Dasgupta |
| 6,009,549 A | | 12/1999 | Bliss et al. |
| 6,031,841 A | * | 2/2000 | Woundy ................. 370/410 |
| 6,078,586 A | * | 6/2000 | Dugan et al. ............. 370/395.2 |
| 6,118,776 A | | 9/2000 | Berman |
| 6,317,415 B1 | | 11/2001 | Darnell et al. |
| 6,341,127 B1 | | 1/2002 | Katsube et al. |
| 6,510,141 B1 | * | 1/2003 | Ramfelt et al. ............. 370/254 |
| 6,538,416 B1 | * | 3/2003 | Hahne et al. ............... 370/431 |
| 6,556,544 B1 | * | 4/2003 | Lee ........................... 370/256 |
| 6,577,630 B1 | | 6/2003 | Markwalter et al. |
| 6,590,903 B1 | | 7/2003 | Hofers et al. |
| 6,603,625 B1 | | 8/2003 | Hospodor et al. |
| 6,611,892 B1 | | 8/2003 | Sasaki et al. |
| 6,628,629 B1 | | 9/2003 | Jorgensen |
| 6,661,806 B1 | | 12/2003 | Eriksson et al. |
| 6,697,914 B1 | | 2/2004 | Hospodor et al. |
| 6,744,772 B1 | | 6/2004 | Eneboe et al. |
| 6,888,831 B1 | | 5/2005 | Hospodor et al. |

OTHER PUBLICATIONS

Alistair Croll and Eric Packman, "Managing Bandwidth—Deploying QOS in Enterprise Networks", Prentice Hall, Upper Saddle River, NJ, pp. 14-15, 217-305, 1999.

(Continued)

*Primary Examiner*—Ricky Ngo
*Assistant Examiner*—Nittaya Juntima
(74) *Attorney, Agent, or Firm*—Howard H. Sheerin, Esq.

(57) ABSTRACT

An isochronous switched fabric network is disclosed comprising a plurality of interconnected switched nodes forming multiple dimensions, each switched node comprising an upstream port and a downstream port for each dimension, each upstream and downstream port comprising an input port and an output port. A discovery facility discovers a depth of each dimension, and discovers resources within each switched node. An addressing facility assigns a matrix address to each switched node, a resource reservation facility reserves resources within each switched node to establish a path through the switched fabric network for transmitting an isochronous data stream, and a scheduling facility schedules isochronous data transmitted through the switched fabric network.

19 Claims, 10 Drawing Sheets

OTHER PUBLICATIONS

Jose Duato, Sudhakar Yalamanchili, Lionel Ni, "Interconnection Networks An Engineering Approach", IEEE Computer Society Press, pp. 35-106, 1997, ISBN 0-8186-7800-3.

InfiniBand Architecture Release 0.9, vol. 1—General Specifications, pp. 47-51; Mar. 31, 2000.

D. D. Kandlur, K. G. Shin, D. Ferrari, "Real-Time Communication in Multihop Networks", IEEE Transactions on Parallel and Distributed Systems, vol. 5, No. 10, pp. 1044-1056, Oct. 1994.

W.C. Lee, M.G. Hluchi, and P.A. Humblet, "Routing Subject to Quality of Service Constraints in Integrated Communication Networks", IEEE Network, pp. 46-55, Jul./Aug. 1995.

J. Rexford, J. Hall, K. G. Shin, "A Router Architecture for Real-Time Communication in Multicomputer Networks", IEEE Transactions on Computers, vol. 47, No. 10, pp. 1088-1101, Oct. 1998.

J. Rexford, J. Dolter and K. G. Shin, "Hardware Support for Controlled Interaction of Guaranteed and Best-Effort Communication", Proceedings of the Workshop on Parallel and Distributed Real-Time Systems, pp. 188-193, Apr. 1994.

D.D. Kandlur and K.G. Shin, "Traffic Routing for Multi-Computer Networks with Virtual Cut-Through Capability", Proc. 10th Int. Conf. Distributed Computing Systems, 1990, pp. 398-405.

J. Rexford and K. G. Shin, "Support and Multiple Classes of Traffic in Multicomputer Routers", Proceedings of the Workshop on Parallel Computer Routing and Communication, pp. 116-130, May 1994.

Allstair Croll and Eric Packman, "Managing Bandwidth—Deploying QOS in Enterprise Networks", Prentice Hall, Upper Saddle River, NJ, pp. 14-15, 217-305, 1999.

Jose Duato, Sudhakar Yalamanchili, Lionel Ni, "Interconnection Networks An Engineering Approach", IEEE Computer Society Press, pp. 35-106, 1997, ISBN 0-8186-7800-3.

InfiniBand Architecture Release 0.9, vol. 1—General Specifications, pp. 47-51; Mar. 31, 2000.

D. D. Kandlur, K. G. Shin, D. Ferrari, "Real-Time Communication in Multihop Networks", IEEE Transactions on Parallel and Distributed Systems, vol. 5, No. 10, pp. 1044-1056, Oct. 1994.

W.C. Lee, M.G. Hluchi, and P.A. Humblet, "Routing Subject to Quality of Service Contraints in Integrated Communication Networks", IEEE Network, pp. 46-55, Jul./Aug. 1995.

J. Rexford, J. Hall, K. G. Shin, "A Router Architecture for Real-Time Communication in Multicomputer Networks", IEEE Transactions on Computers, vol. 47, No. 10, pp. 1088-1101, Oct. 1998.

J. Rexford, J. Dolter and K. G. Shin, "Hardware Support for Controlled Interaction of Guaranteed and Best-Effort Communication", Proceedings of the Workshop on Parallel and Distributed Real-Time Systems, pp. 188-193, Apr. 1994.

D.D. Kandlur and K.G. Shin, "Traffic Routing for Multi-Computer Networks with Virtual Cut-Through Capability", Proc. 10th Int. Conf. Distributed Computing Systems, 1990, pp. 398-405.

"Hybrid Switch for a Highly Parallel System", IBM Technical Disclosure Bulletin. vol. 33, Issue No. 1A. Jun., 1990. pp. 214-217.

Aaron Brown, "The UC Berkeley ISTORE Project: Bringing Availability, Maintainability, and Evolutionary Growth to Storage-Based Clusters", http://iram.CS.Berkeley.EDU/store/talks/lucent-jan00/sld001.htm, Jan. 19, 2000.

J. Rexford and K. G. Shin, "Support for Multiple Classes of Traffic In Multicomputer Routers", Proceedings of the Workshop on Parallel Computer Routing and Communication, pp. 116-130, May 1994.

\* cited by examiner

```
INIT PACKET
{
        START_ID;
        LOW_ID;
        INIT_DNN[DIMS];
        DIM_DEPTH[DIMS];
}
```

FIG. 4A

```
NODE
{
        LOCAL_ID;
        LOCAL_DNN[DIMS];
        LOCAL_DEPTH[DIMS];
}
```

FIG. 4B

```
RESOURCE PACKET
{
        RESOURCE
                MAX_RESOURCE;
                AVAIL_RESOURCE;

RESOURCE BUFFER;
        RESOURCE BANDWIDTH;
        RESOURCE PROCESSING;
                .
                .
                .
}
```

ISOCHRONOUS SWITCHED FABRIC NETWORK

CROSS REFERENCE TO RELATED APPLICATIONS AND PATENTS

This application is related to several co-pending U.S. patent applications, namely Ser. No. 9/728,634 entitled "CONVERTING ASYNCHRONOUS PACKETS INTO ISOCHRONOUS PACKETS FOR TRANSMISSION THROUGH A MULTI-DIMENSIONAL SWITCHED FABRIC NETWORK" filed concurrently herewith, Ser. No. 09/675,850 entitled "DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA" filed on Sep. 28, 2000, and Ser. No. 09/660,002 entitled "SWITCHED NODE COMPRISING A DISK CONTROLLER WITH INTEGRATED MULTI-PORT SWITCHING CIRCUITRY" filed on Sep. 11, 2000. The disclosures for the above referenced patent applications are incorporated herein by reference.

BACKGROUND OF THE INVENTION

1. Field of the Invention

The present invention relates to computer networks. More particularly, the present invention relates to an isochronous switched fabric network.

2. Description of the Prior Art

Switched fabric networks comprise a number of nodes with bi-directional ports interconnected to form a multi-dimensional topology. Switched fabric networks which support asynchronous (best-effort) and isochronous (time-constrained) data are suggested in the prior art, such as in a paper by Jennifer Rexford entitled "A Router Architecture for Real-Time Communication in Multicomputer Networks", *IEEE Transactions on Computers*, Vol. 47, No. 10, October 1998. However, the prior art implementations proposed to date are more academic investigations rather than practical implementations and do not address issues such as circuit complexity and cost, transmission variance, and deadlock prevention.

There is, therefore, a need for an improved isochronous switched fabric network which decreases circuit complexity and cost, provides tighter control on transmission variance, and mitigates deadlock occurrence.

SUMMARY OF THE INVENTION

The present invention may be regarded an isochronous switched fabric network comprising a plurality of interconnected switched nodes forming multiple dimensions, each switched node comprising an upstream port and a downstream port for each dimension, each upstream and downstream port comprising an input port and an output port. A discovery facility discovers a depth of each dimension, and discovers resources within each switched node. An addressing facility assigns a matrix address to each switched node, a resource reservation facility reserves resources within each switched node to establish a path through the switched fabric network for transmitting an isochronous data stream, and a scheduling facility schedules isochronous data transmitted through the switched fabric network.

The present invention may also be regarded as a method of transmitting data through an isochronous switched fabric network comprising a plurality of interconnected switched nodes forming multiple dimensions, each switched node comprising an upstream port and a downstream port for each dimension, each upstream and downstream port comprising an input port and an output port. A depth of each dimension, together with the resources within each switched node, are discovered. A matrix address is assigned to each switched node, resources are reserved within each switched node to establish a path through the switched fabric network for transmitting an isochronous data stream, and isochronous data is scheduled for transmission through the switched fabric network.

DESCRIPTION OF THE PREFERRED EMBODIMENTS

Figure 1:
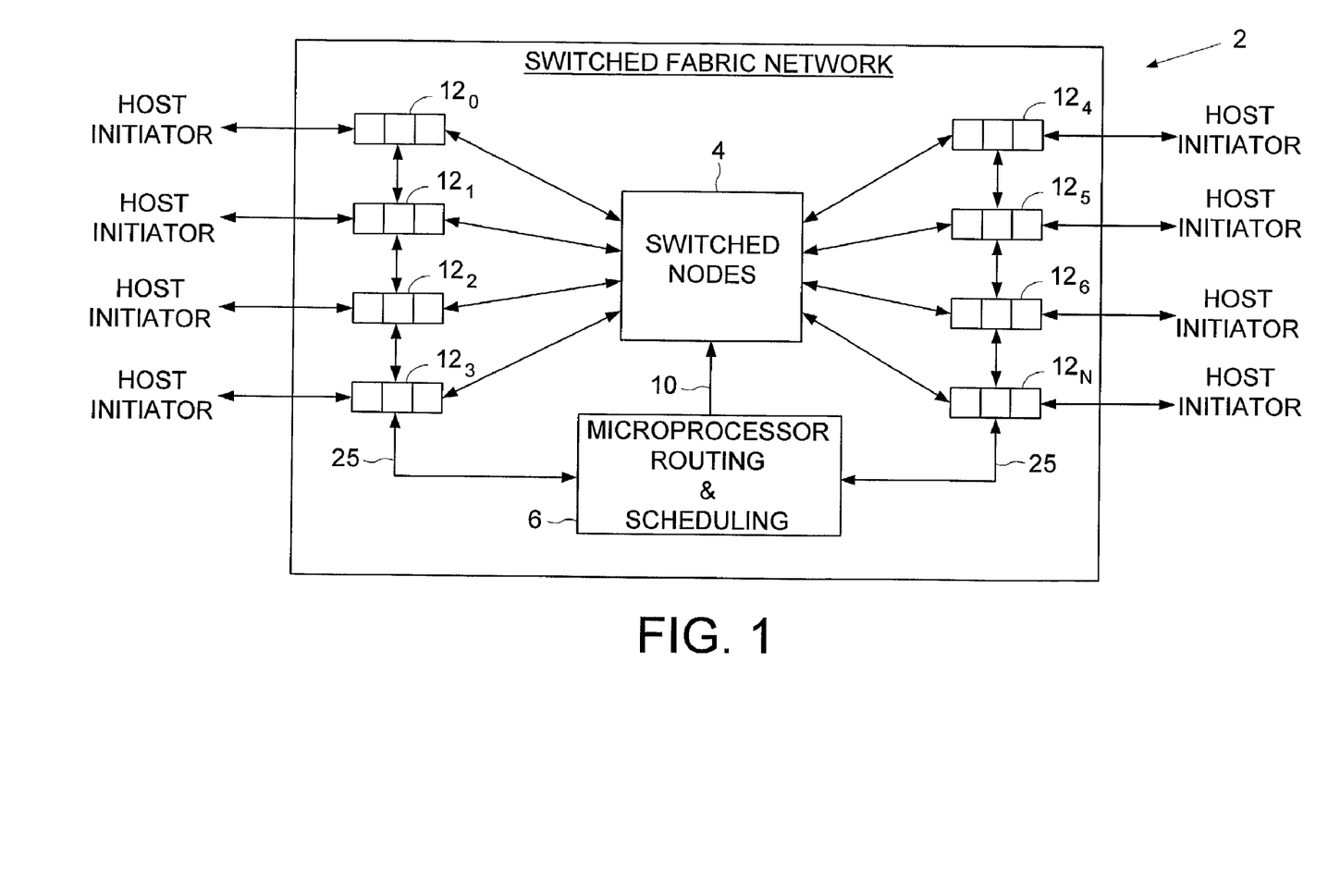
FIG. 1 shows switched fabric network according to an embodiment of the present invention comprising a plurality of interconnected switched nodes forming multiple dimensions.
Figure 2:
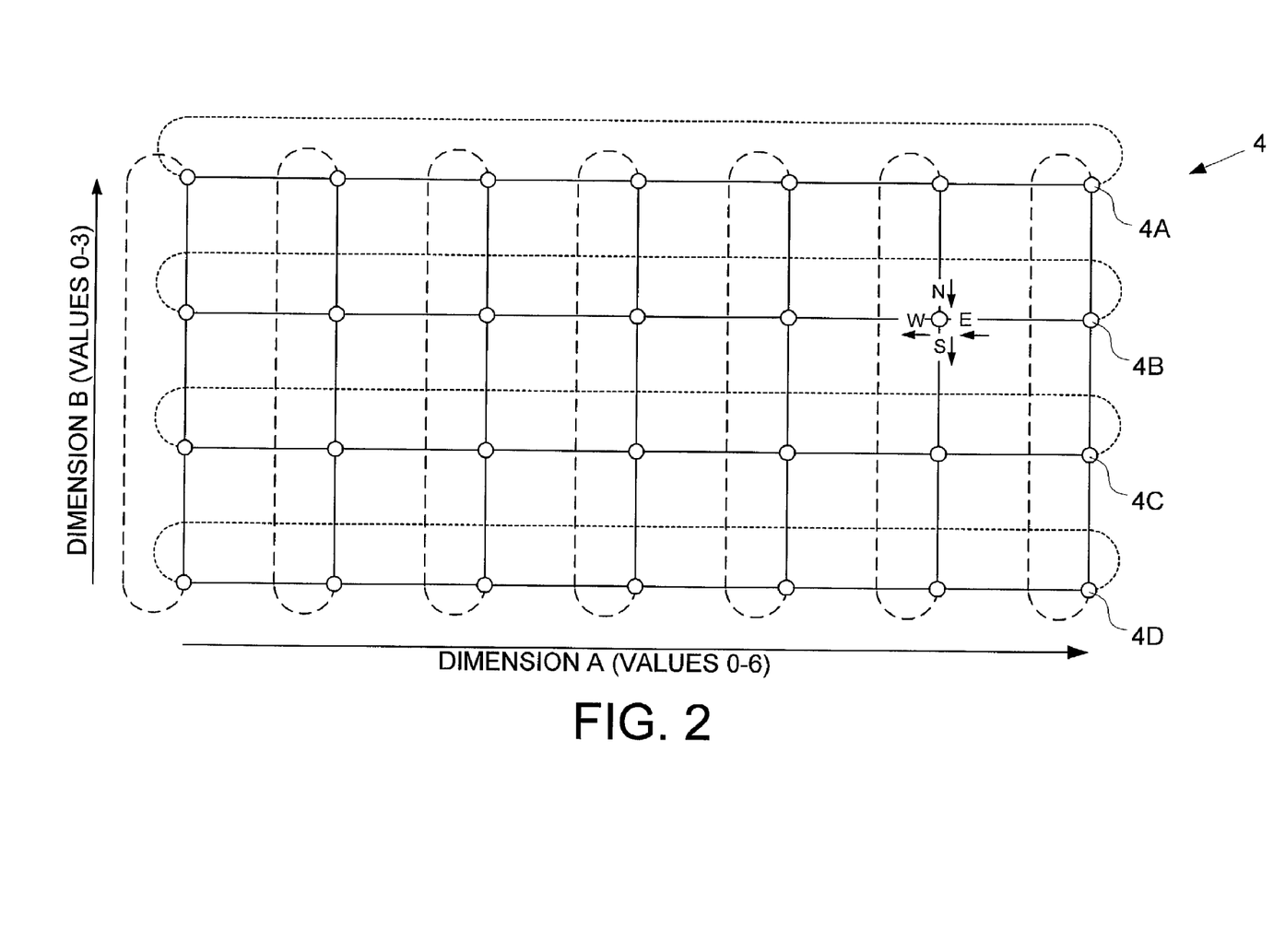
FIG. 2 shows an example topology for the switched nodes of FIG. 1 as a two dimensional switched fabric, wherein the switched nodes are connected in each dimension to form a loop.
Figure 8:
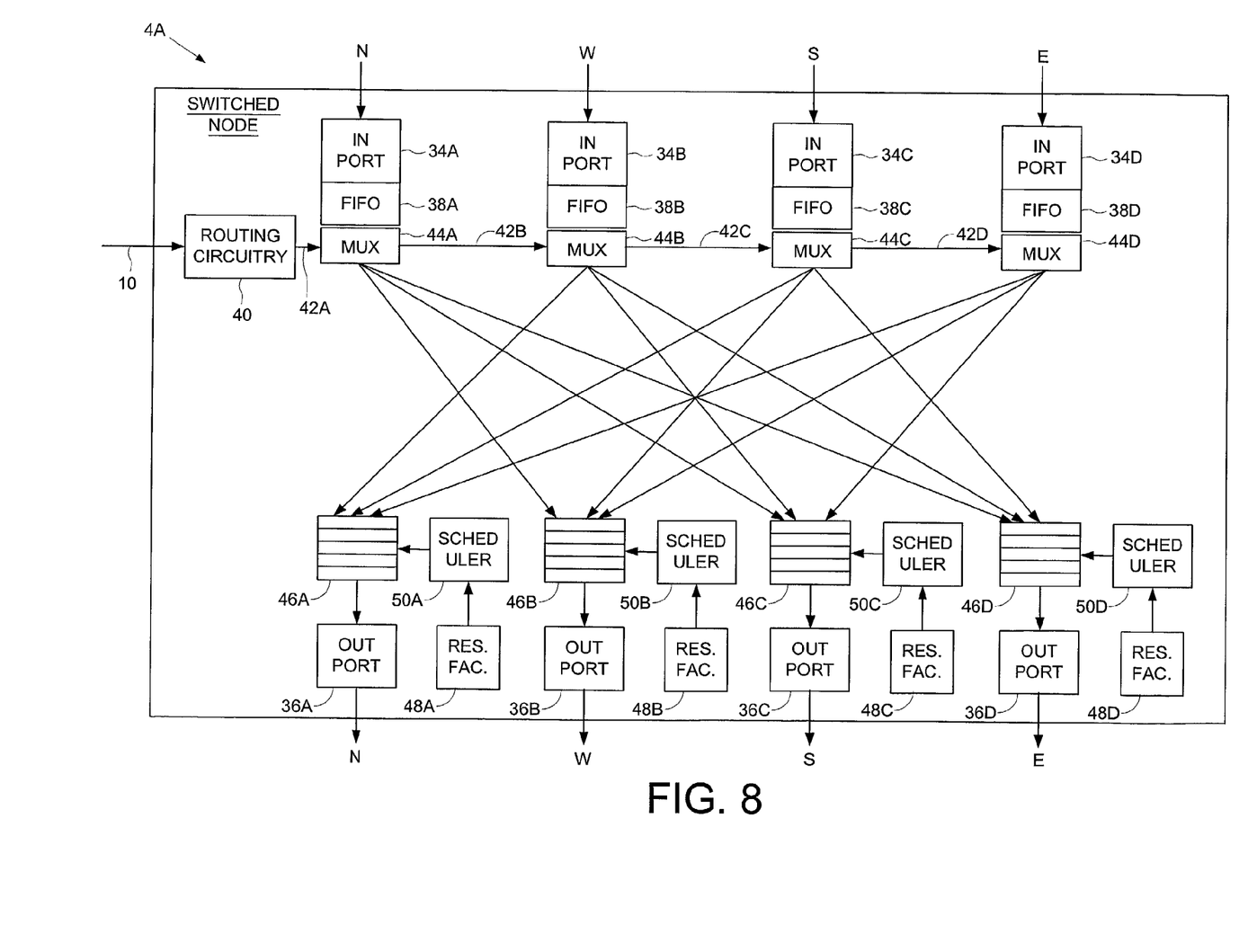
FIG. 8 shows a suitable switched node for use in the embodiments of the present invention as comprising an upstream port and a downstream port for each dimension, a reservation facility for reserving resources within the switched node, and a scheduling facility for scheduling the transmission of isochronous data through the switched fabric network.

FIG. 1 shows an isochronous switched fabric network 2 according to an embodiment of the present invention as comprising a plurality of interconnected switched nodes 4 forming multiple dimensions. As shown in FIG. 2, each switched node 4A comprises an upstream port and a downstream port for each dimension, each upstream and downstream port comprises an input port and an output port (FIG. 8). A discovery facility discovers a depth of each dimension, and discovers resources within each switched node. An addressing facility assigns a matrix address 8B (FIG. 3B) to each switched node, a resource reservation facility reserves resources within each switched node to establish a path through the switched fabric network for transmitting an isochronous data stream, and a scheduling facility schedules isochronous data transmitted through the switched fabric network.

Each of the switched nodes in FIG. 2 comprises four bi-directional ports (North, East, South and West) forming a two-dimensional fabric. Each dimension comprises an upstream port and a downstream port. For dimension A, the East port is the upstream port and the West port is the downstream port, and for dimension B, the North port is the upstream port and the South port is the downstream port. In an embodiment described below, an initialization packet is transmitted between the nodes within a dimension by transmitting the initialization packet via the downstream port. In the embodiment of FIG. 1, control data 10 is generated by a switched fabric microprocessor 6 to configure the switched nodes 4 with routing and scheduling information. In another embodiment, the control data 10 is generated by the switched nodes 4 to implement a distributed routing and scheduling algorithm.

In one embodiment, the network data transmitted through the switched nodes 4 consist of packets having a packet header comprising routing data which identifies the destination node for the packet. In the embodiment of FIG. 1, the packets are buffered in buffers $12_0$–$12_N$, and the microprocessor 6 processes the packet header in order to route the packet through the switched nodes 4. A suitable routing algorithm implemented by the microprocessor 6 of FIG. 1 generates control data 10 for configuring the switched nodes 4. Any suitable routing algorithm may be employed, and it may support Unicast, Multicast, or Broadcast delivery mechanisms. The routing decisions may be made centrally, at the source, distributed, or multiphase, implemented using a lookup table or using a finite-state machine. Further, the routing algorithm may be deterministic or adaptive. A discussion of example routing algorithms which may be employed in the embodiments of the present invention is provided by Jose Duato et al. in the text book "Interconnection Networks, an Engineering Approach", IEEE Computer Society, 1997.

The routing algorithm is implemented a layer "above" the switching layer, and thus the routing algorithm may be compatible with various different switching algorithms, for example, Virtual Cut-Through Switching, Wormhole Switching, and Mad Postman Switching. In addition, topologies other than the two-dimensional switched fabric of FIG. 2, as well as topologies comprising more than two dimensions, may be employed in the present invention by decreasing or increasing the number of bi-directional ports per switched node. Example topologies and switching algorithms which may be employed in the embodiments of the present invention are discussed in the aforementioned text book by Jose Duato et al.

The discovery facility of the switched fabric network discovers the topology of the switched nodes 4 by discovering the depth of each dimension and discovers the resource capabilities at each switched node within the fabric. In one embodiment, the discovery facility transmits an initialization packet "downstream" through the switched nodes 4 wherein each switched node modifies the initialization packet to facilitate the dimension discovery process. In the embodiment of FIG. 2, the switched nodes 4 are connected in each dimension to form a loop so that the initialization packet will "wrap around" to a starting node within each dimension.

In one embodiment, the discovery facility is implemented by a central microprocessor, such as the switched fabric microprocessor 6 shown in FIG. 1. In an alternative embodiment, the microprocessor is attached to one of the switched nodes 4. In both embodiments, an initialization packet is injected into the switched nodes 4 starting at a selected one of the switched nodes. In an alternative embodiment, each node within a dimension injects an initialization packet into the switched fabric network. The initialization packet is transmitted through the output port of each downstream port to the input port of the corresponding upstream ports of adjacent switched nodes. Each switched node along each dimension modifies the initialization packet and forwards the initialization packet through the corresponding downstream port for the dimension. The initialization packet is eventually routed back to the starting switched node and then evaluated to determine the depth of each dimension.

Referring again to FIG. 2, an initialization packet may be started at node 4A, transmitted via the downstream port to node 4B, then to node 4C, to node 4D, and back to node 4A. Each node modifies the initialization packet to reflect its depth within the dimension. When the initialization packet wraps around to node 4A, it is evaluated to determine the depth of the dimension (four in this example). In order to determine the depth of each dimension, initialization packets are routed to each of the switched nodes and then back to the starting node 4A using any suitable routing technique.

Figure 3A:
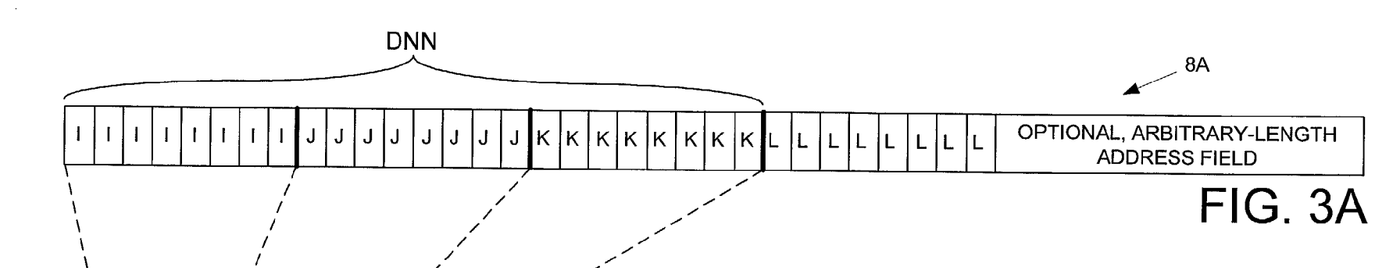
FIG. 3A shows a matrix address assigned to an initialization packet used to discover the number and depth of each dimension in the switched fabric network.

In one embodiment, the addressing facility uses the initialization packet to assign a matrix address to each of the switched nodes 4. FIG. 3A shows an example matrix address 8A comprising a dimension node number (DNN) comprising a plurality of sub-fields ("I"–"L" in this example), where each sub-field corresponds to a dimension in the fabric. The matrix address 8A of FIG. 3A also comprises an optional, arbitrary-length address field which may be used to address a switched node within a subnet, wherein the subnet is addressed by the sub-fields "I"–"L" in the matrix address.

Figure 3B:
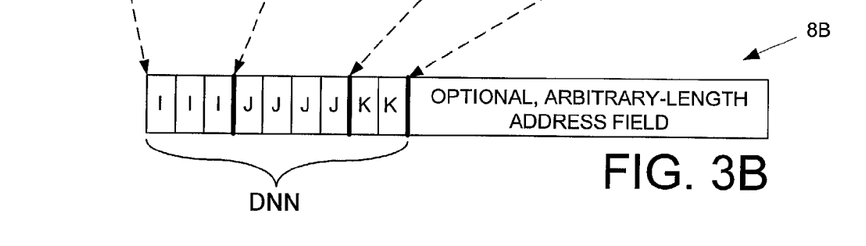
FIG. 3B shows an concatenated matrix address assigned to each of the switched nodes of FIG. 2, wherein the matrix address comprises a dimension node number (DNN) comprising a plurality of contiguous sub-fields corresponding to each dimension where each sub-field comprises an optimum number of bits needed to represent each dimension.

When initializing the switched fabric network, the number and depth of each dimension is unknown. An initialization matrix address comprising an initialization DNN is used during the discovery process. The initialization DNN comprises a maximum number of sub-fields to represent a maximum number of dimensions and each sub-field comprises a maximum number of bits to represent a maximum depth of each dimension. Once the number of dimensions and depth of each dimension has been discovered, the matrix address is reduced to an optimal matrix address, such as the matrix address 8B shown in FIG. 3B which comprises three sub-fields "I"–"K" corresponding to a three-dimensional matrix. Each sub-field comprises the optimal number of bits to represent the number of nodes in their respective dimensions. In the example of FIG. 3B, the dimension corresponding to sub-field "I" comprises a depth of eight or less nodes, the dimension corresponding to sub-field "J" comprises a depth of sixteen or less nodes, and the dimension corresponding to sub-field "K" comprises a depth of four or less nodes In general, the optimal number of bits n needed to represent a dimension is:

$$n=\text{round}(0.5+(\log(\text{dimension\_depth})/\log(2)))$$

where the dimension_depth is the depth of the dimension corresponding to the sub-field.

Figure 4A:
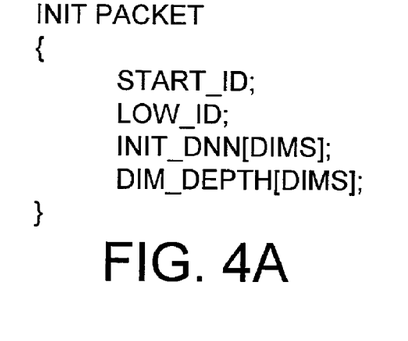
FIG. 4A shows a suitable data structure for the dimensional initialization packet.
Figure 4B:
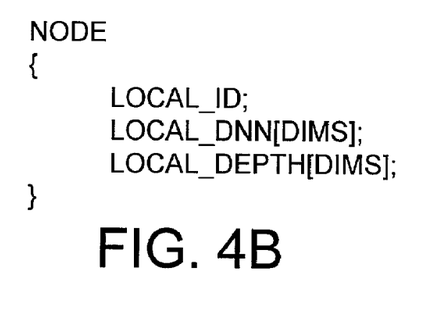
FIG. 4B shows a suitable data structure employed by each switched node in the switched fabric network for use in the dimensional discovery process.

FIG. 4A shows a suitable data structure for the initialization packet used during the dimension discovery process, and FIG. 4B shows a suitable data structure employed by each of the switched nodes 4 during the dimension discovery process. The initialization packet of FIG. 4A comprises a starting ID (START_ID), a low ID (LOW_ID), an initialization DNN (INIT_DNN) comprising a number of sub-fields equal to the maximum number of dimensions allowed in a switched fabric network, and a dimension depth array (DIM_DEPTH[DIMS]) for storing a depth value for each dimension. The node data structure of FIG. 4B comprises a LOCAL_ID (e.g., a serial number), a LOCAL_DNN comprising a number of sub-fields equal to the number of dimensions in the switched fabric network, and a LOCAL_DEPTH array for storing a dimension value for each dimension. When the dimension discovery process is complete, the LOCAL_DNN for each node corresponds to the node's matrix location within the switched fabric network.

Figure 5:
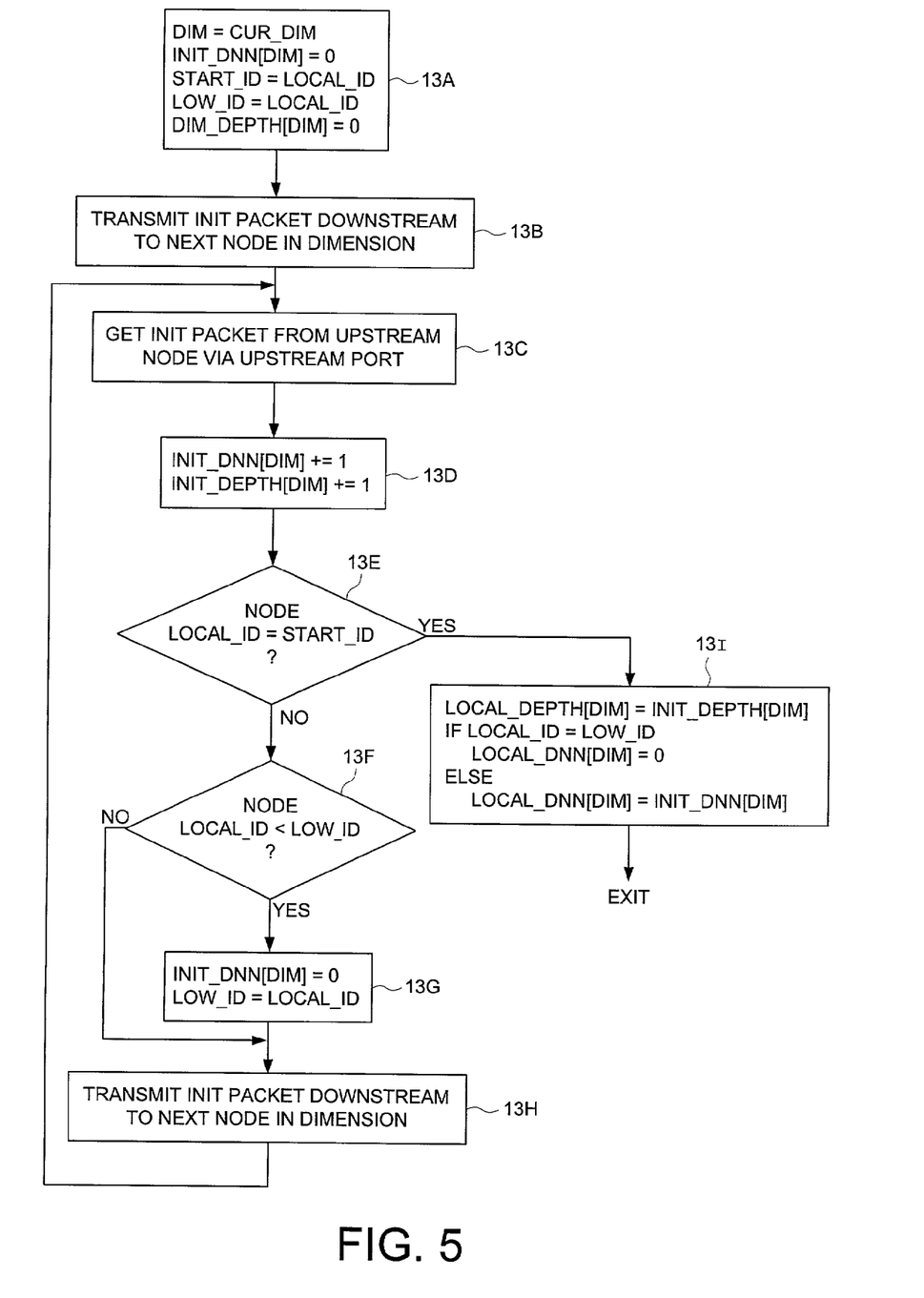
FIG. 5 shows a flow chart illustrating a discovery process for discovering the depth of a dimension within the switched fabric network according to an embodiment of the present invention.

FIG. 5 shows a flow diagram suitable for implementing the dimension discovery process according to an embodiment of the present invention. The flow diagram of FIG. 5 is executed for each dimension in the switched fabric network (e.g., dimensions A and B of FIG. 2). Further, the flow diagram of FIG. 5 is executed concurrently by each node within a dimension (i.e., each node constructs and transmits an initialization packet downstream) so as to implement a distributed dimension discovery facility.

At step 13A, a dimension DIM is assigned to a current dimension, and the variables of an initialization packet are set to starting values. The initialization packet's INIT_DNN [DIM] is set to zero, its START_ID and LOW_ID are set to the LOCAL_ID for the node, and its DIM_DEPTH[DIM] is set to zero. At step 13B, each node in the dimension transmits an initialization packet via the downstream port, and at step 13C each node receives an initialization packet via the upstream port. At step 13D, the INIT_DNN[DIM] and INIT_DEPTH of the received initialization packet are incremented, and at step 13E the LOCAL_ID of the node is compared to the START_ID of the initialization packet. If the LOCAL_ID of the node does not equal the START_ID of the initialization packet, then at step 13F the LOCAL_ID of the node is compared to the LOW_ID of the initialization packet. If the LOCAL_ID of the node is less than the LOW_ID of the initialization packet, then at step 13G the sub-field within the INIT_DNN corresponding to the current dimension DIM is set to zero, and the LOW_ID of the initialization packet is set to the LOCAL_ID of the node.

At step 13H the initialization packet is transmitted via the downstream port to the next node in the dimension, and the dimension discovery process loops back to step 13C. If at step 13E the LOCAL_ID of the node equals the START_ID of the received initialization packet, the initialization packet has traversed the dimension and looped back to the starting node. At step 13I the LOCAL_DEPTH variable within the node for the current dimension DIM is assigned to the INIT_DEPTH[DIM] of the initialization packet. If the LOCAL_ID of the node equals the LOW_ID of the initialization packet, then the LOCAL_DNN[DIM] of the node is set to zero since it has the lowest LOCAL_ID in the dimension and is therefore the "starting" node for the dimension. Otherwise, the LOCAL_DNN[DIM] of the node is set to the INIT_DNN[DIM] of the initialization packet.

When the dimension discovery process terminates, the switched node within each dimension comprising the smallest LOCAL_ID has assigned to its sub-field within the LOCAL_DNN a value of zero to indicate it is the "starting" node in the dimension, and the switched nodes that are "downstream" from the starting node in the same dimension have an incrementally higher LOCAL_DNN. In one embodiment, the data structures of each node are transmitted to a central microprocessor (e.g., microprocessor 6 of FIG. 1) or to a central switched node (e.g., switched node 4A) which evaluates the data structures to determine the topology of the entire switched fabric network.

Figure 4C:
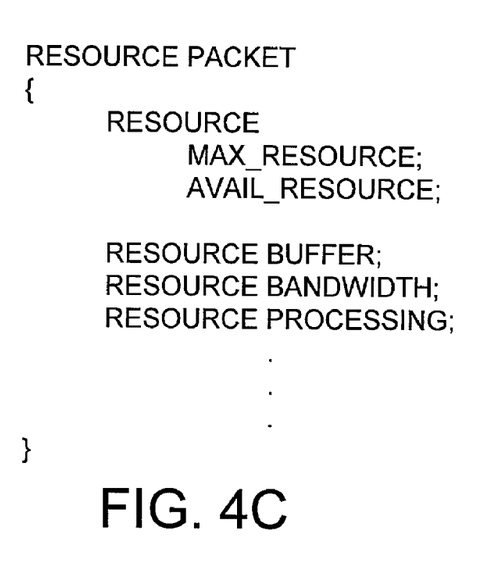
FIG. 4C shows a suitable data structure for a resource packet transmitted between the switched nodes for discovering the resource capabilities within the switched nodes.

In one embodiment, the resources available within each switched node are discovered by transmitting a resource packet between the switched nodes 4. FIG. 4C shows a resource packet according to one embodiment comprising a RESOURCE data structure comprising variables MAX_RESOURCE and AVAIL_RESOURCE. The variable MAX_RESOURCE stores the maximum capability of a specific resource, and the variable AVAIL_RESOURCE stores the amount or percentage of the MAX_RESOURCE that is currently available (unused). The resource packet comprises a plurality of variables of type RESOURCE, such as a buffer, bandwidth, or processing capability. In one embodiment, the resource discovery and management facility is centralized; resource packets are routed from a central microprocessor 6 to the switched nodes 4 and back to the central microprocessor 4. In an alternative embodiment, the resource discovery and management facility is distributed; the switched nodes 4 discover and manage the available resources by routing resource packets between one another.

Discovering the depth of each dimension in order to optimize the matrix address decreases the expense and increases the efficiency and routing speed of the switched fabric network. In addition, representing the switched nodes 4 using a matrix address and discovering the resource capabilities of each node facilitates establishing a path through the switched fabric network for the transmission of an isochronous data stream.

Figure 6A:
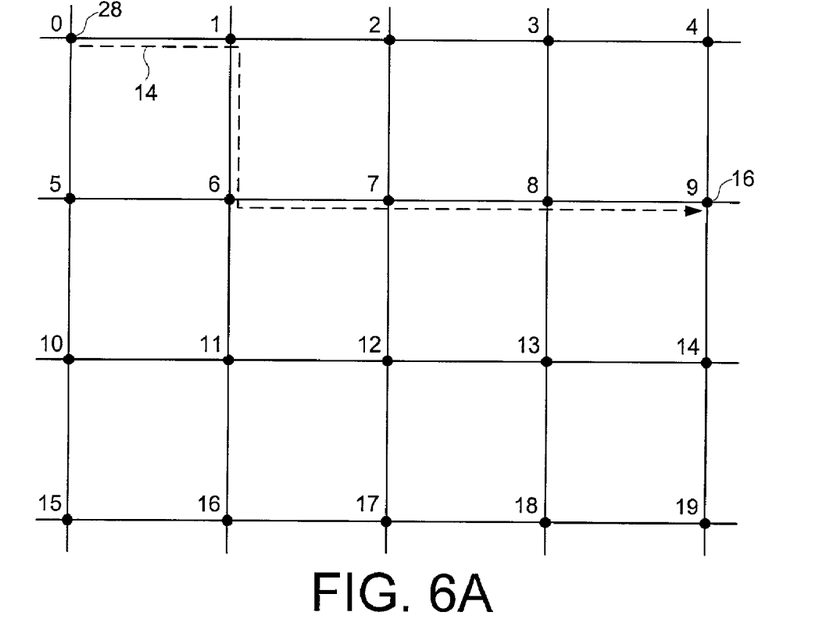
FIGS. 6A and 6B illustrate a resource reservation facility according to an embodiment of the present invention, wherein resources are reserved within each switched node to establish a path through the switched fabric network for transmitting an isochronous data stream.
Figure 6B:
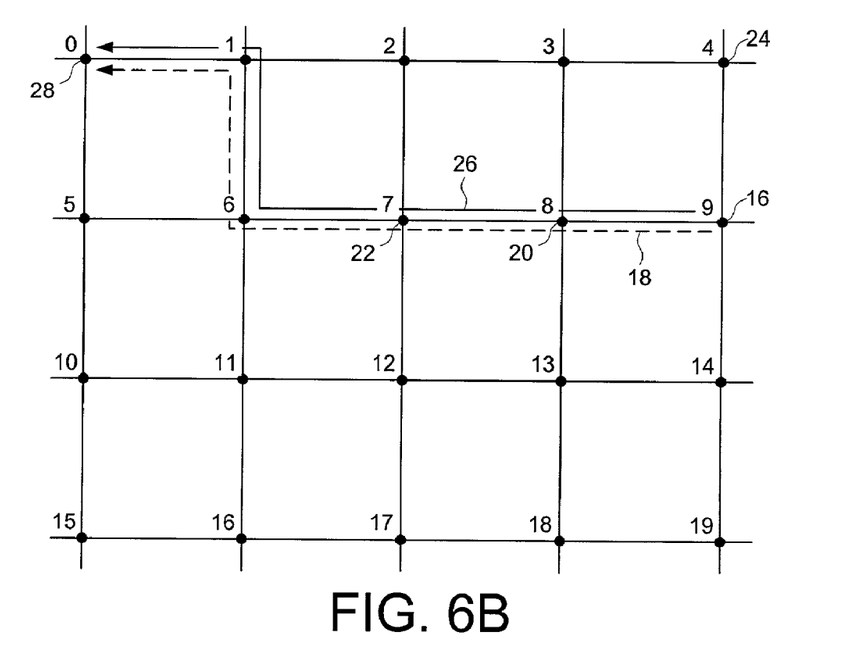

In one embodiment, a path is established through the switched fabric network using the technique disclosed in the above referenced patent application entitled "DISTRIBUTED RESOURCE RESERVATION SYSTEM FOR ESTABLISHING A PATH THROUGH A MULTI-DIMENSIONAL COMPUTER NETWORK TO SUPPORT ISOCHRONOUS DATA". FIGS. 6A and 6B illustrate the resource reservation system. A request packet 14 is injected into the network, the request packet 14 specifying a request to transmit the isochronous data from one of a plurality of source nodes. The request packet is routed to at least one of the plurality of source nodes 16, and the source node 16 determines whether it has sufficient resources to support transmitting the isochronous data. If the source node 16 comprises sufficient resources to support transmitting the isochronous data, the source node 16 reserves resources within the source node 16 to support transmitting the isochronous data, and transmits an acknowledge (ack) packet 18 from the source node 16 to a first neighboring node 20 as shown in FIG. 6B. The first neighboring node 20 determines whether it has sufficient resources to support transmitting the isochronous data. If the first neighboring node 20 comprises sufficient resources to support transmitting the isochronous data, the first neighboring node 20 reserves resources within the first neighboring node 20 to support transmitting the isochronous data, and transmits the ack packet 18 to an adjacent node 22. If the first neighboring node 20 does not comprise sufficient resources to support transmitting the isochronous data, the first neighboring node 20 transmits a negative-acknowledge (nack) packet to the source node 16 and the source node 16 transmits the ack packet 18 to a second neighboring node (e.g., node 24). Once a path is established, the isochronous data stream 26 is transmitted through the path from the source node 16 to the destination node 28.

The matrix address 8B of FIG. 3B facilitates routing the request packet 14 to the source node 16, as well as routing the ack packet 18 to the destination node 28 to establish the path. In one embodiment, routing is implemented by reducing the absolute distance in one dimension to zero, before traversing a second dimension. In another embodiment, a diagonal routing scheme is implemented by reducing the absolute distance in the dimension having the greatest distance until all the distances are equal. Thereafter, the distances are reduced by stepping once in each dimension.

In one embodiment, the resource reservation facility is distributed throughout the switched nodes 4, and each switched node comprises a leasing facility for leasing idle resources to other switched nodes. This embodiment exploits the maximum bandwidth of the switched fabric network by utilizing resources rather than allowing them to remain idle. Bandwidth, buffer, and processing power are examples of idle resources which may be leased to other nodes.

Figure 7:
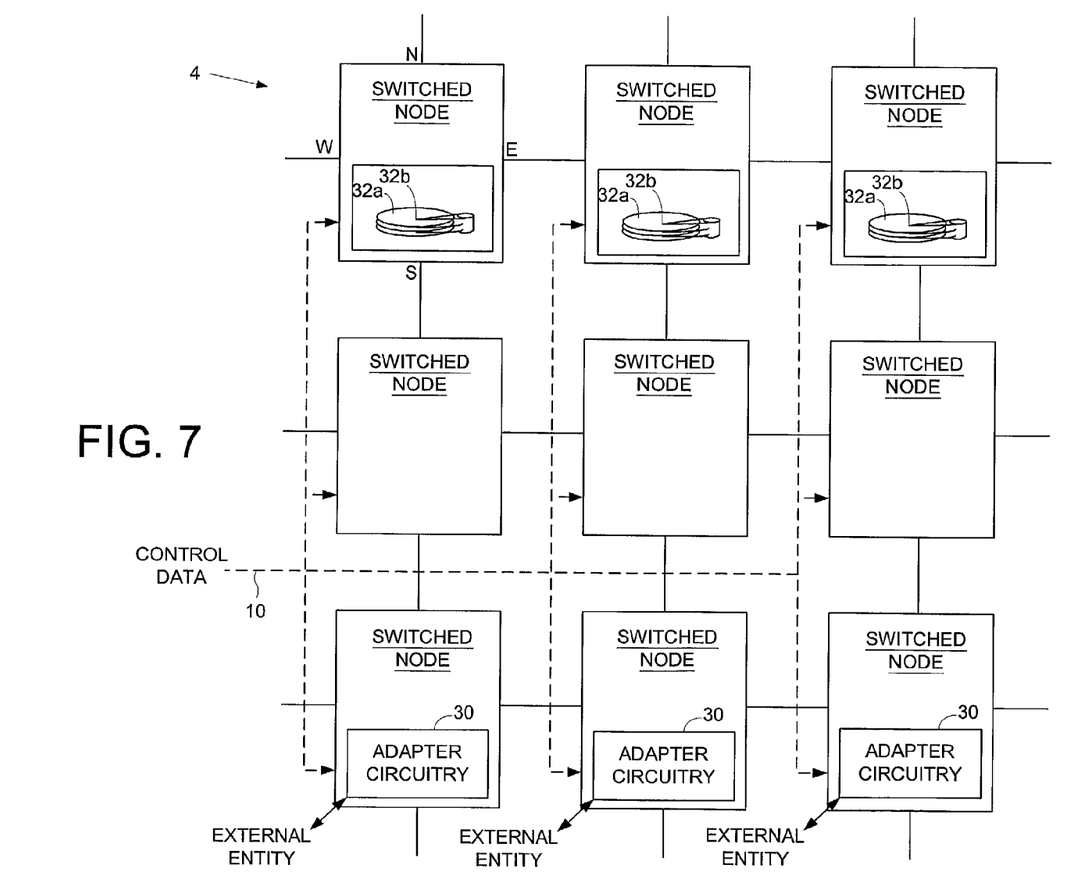
FIG. 7 shows an embodiment of the present invention wherein a select number of the switched nodes comprise a storage device implemented as a disk and a head, and a select number of the nodes comprise adapter circuitry for connecting to an external entity.

In the embodiment shown in FIG. 7, the switched nodes 4 constituting the switched fabric suitably comprise processing circuitry and memory to facilitate the routing, scheduling and resource reservation operations. In one embodiment, a select number of the switched nodes 4 also comprise adapter circuitry 30 for interfacing with an external entity (e.g., a host initiator in FIG. 1) at the "edge" of the fabric. In addition, the switched nodes 4 may or may not comprise a disk 32a and a head 32b for implementing non-volatile storage at the node. In another embodiment, a selected number of the switched nodes comprise a microprocessor for implementing a distributed routing algorithm.

FIG. 8 shows a switched node 4A for use in the isochronous switched fabric network 2 of FIG. 1 according to an embodiment of the present invention. The switched node 4A comprises four input ports 34A–34D and four output ports 36A–36D corresponding to the North, East, South and West ports shown in FIG. 2. Data packets received from the input ports 34A–34D are buffered in FIFO buffers 38A–38D. The switched node 4A further comprises routing circuitry 40 configured by the control data 10 which, in one embodiment, is generated by the microprocessor 6 of FIG. 1. In another embodiment, the routing operation is distributed such that the control data 10 is generated by other nodes in the network. The routing circuitry 40 generates control signals 42A–42D which configure multiplexers 44A–44D in order to route the data packets to appropriate data buffers 46A–46D associated with the output ports 36A–36D. In this manner, the data packets cross the switched node 4A immediately except for the delay of the FIFO buffer 38A–38D. The FIFO buffers 38A–38D provide buffering of input data in the event that the target data buffer 46A–46D is full or busy receiving data from another of the input ports.

The switched node 4A of FIG. 8 further comprises a reservation facility 48A–48D for reserving the resources to support the transmission of isochronous data. The resource reservation facility 48A–48D may, for example, reserve a virtual lane within a data buffer 46A–46D to transmit the isochronous data. In one embodiment, control packets are transmitted asynchronously to other switched nodes in the network to facilitate reserving resources in the path. The asynchronous control packets are transmitted across the switched nodes during "dead times" when isochronous data is not being transmitted. Once the path has been established, a corresponding path ID is assigned to the isochronous data. In yet another embodiment, the isochronous data is transmitted concurrent with reserving the path through the switched nodes, and the path is "torn down" as the isochronous data traverses the network.

The switched node 4A of FIG. 8 further comprises a scheduler 50A–50D for scheduling the time when the data packets are to be transferred from the data buffers 46A–46D to the output ports 36A–36D. In one embodiment, the timing information for the packets is stored in the packet headers and processed by the scheduler 50A–50D together with deadline information stored in the routing circuitry 40. An isochronous packet comprises a path ID for identifying a path reserved through the switched nodes 4 of FIG. 2, and an arrival time parameter identifying a target arrival time into each of the switched nodes 4. The routing circuitry 40 is programmed via the control data 10 to route the isochronous packets to the appropriate output ports 36A–36D corresponding to the reserved path. The routing circuitry 40 of FIG. 8 is also programmed via the control data 10 with deadline information specifying the minimum delay from the time an isochronous packet arrives at the input port 34A–34D to the time it should be forwarded to the next node via the output port 36A–36D in order to support the guaranteed delivery time to the destination node. Before an isochronous packet is forwarded to the next node, the arrival time is incremented by the deadline time of the current node. The isochronous packet may actually arrive early at the next node, in which case it is buffered in one or more of the data buffers 46A–46D. The scheduler 50A–50D will not transfer isochronous packets with an early arrival time. Instead, the scheduler 50A–50D will wait until the current time exceeds the arrival time before queuing an isochronous packet for transmission to the next node.

In one embodiment, the data buffers 46A–46D comprise a plurality of virtual lanes where each virtual lane is assigned a predetermined priority level. The scheduler 50A–50D schedules the data packets according to the timing information by queuing the data packets in the appropriate virtual lanes. For example, data packets with shorter transmission deadlines are queued in higher priority virtual lanes, whereas data packets with longer transmission deadlines are queued in lower priority virtual lanes.

The switched node 4A of FIG. 8 can be extended to add dimensionality by duplicating the circuitry associated with each bi-directional port (input port 34, FIFO 38, MUX 44, output port 36, etc.). In one embodiment, the switched node 4A is a commodity device which comprises a facility for dynamically configuring the bi-directional ports to support a desired switched fabric topology. Thus, a number of the input ports 34A–34D and/or a number of the output ports 36A–36D may be configured to connect to ports of other switched nodes, whereas the remaining ports may be left unconnected.

Figure 9:
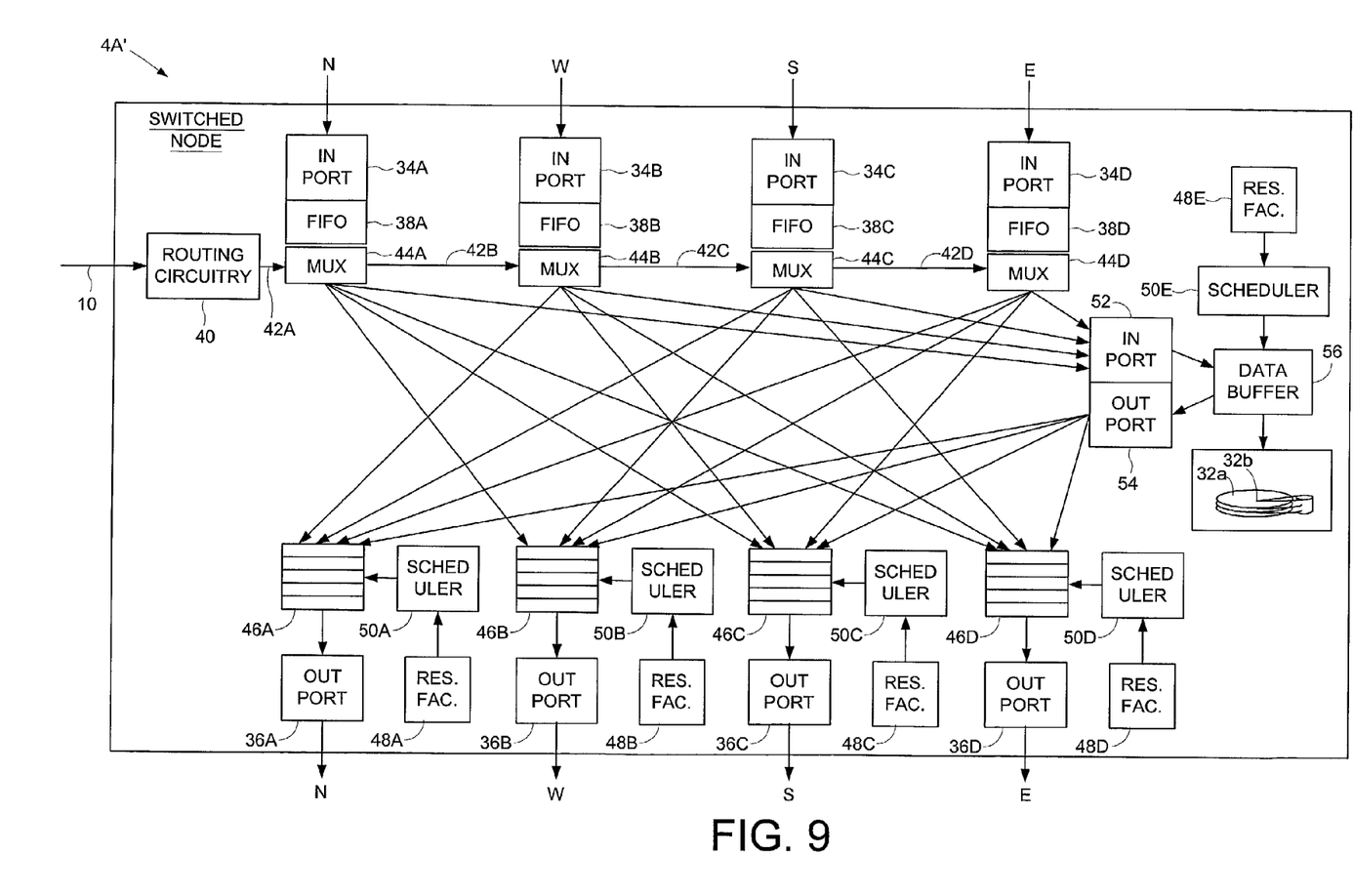
FIG. 9 shows a suitable switched node for use in the embodiments of the present invention as comprising a storage device implemented as a disk, a head, and a data buffer for implementing a distributed network storage system.

FIG. 9 shows a switched node 4A' according to an alternative embodiment of the present invention comprising an internal input port 52 and output port 54 for accessing a storage device within the switched node 4A'. In the embodiment of FIG. 9, the storage device comprises a data buffer 56 for interfacing with a disk 32a and a head 32b for implementing a non-volatile storage device. The switched node 4A' further comprises a resource reservation facility 48E for reserving resources associated with the storage device, and a scheduler 50E for scheduling the transmission of data packets originating from the storage device. The storage device is not limited to a disk 32a; any suitable storage medium may be employed, including silicon memory such as flash memory. For further details of the embodiment wherein the switched node 4A' comprises a storage device, see the above referenced patent application entitled "SWITCHED NODE COMPRISING A DISK CONTROLLER WITH INTEGRATED MULTI-PORT SWITCHING CIRCUITRY".

Figure 10:
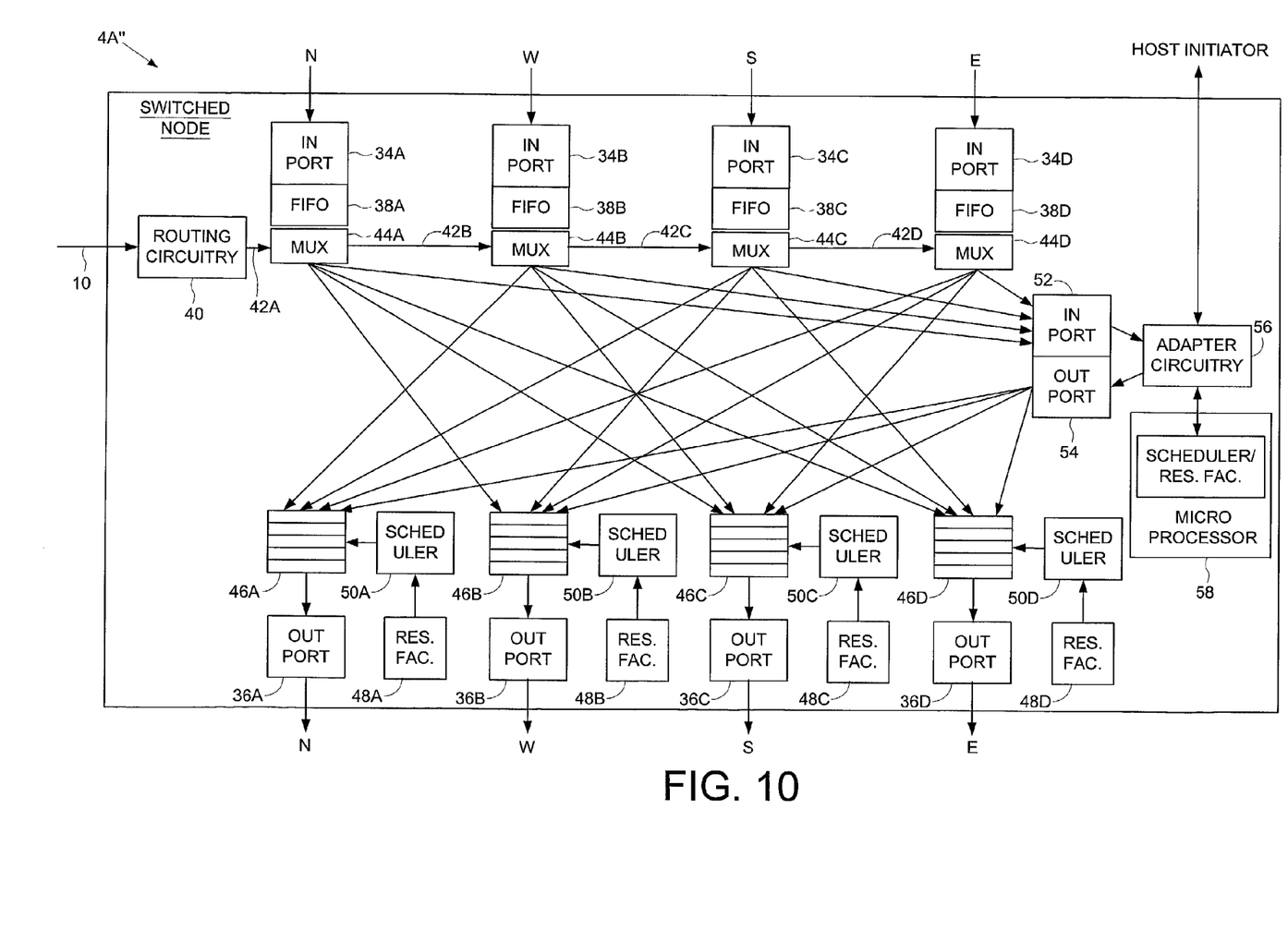
FIG. 10 shows a suitable switched node for use in the embodiments of the present invention as comprising adapter circuitry for connecting to an external entity and a microprocessor for implementing scheduling, resource reservation, and asynchronous/isochronous conversion.

FIG. 10 shows a switched node 4A" according to an alternative embodiment as comprising adapter circuitry 56 connected to receive asynchronous and isochronous packets from an external entity. Each asynchronous packet comprises destination node routing information and data, and each isochronous packet comprises a path ID corresponding to a reserved path through the network, an arrival time parameter identifying a target arrival time of the isochronous packet into the switched node, and data. An asynchronous-to-isochronous converter 58 converts the asynchronous packets into isochronous packets comprising the data from the asynchronous packets. The plurality of bi-directional ports also receive isochronous packets from other switched nodes and transmit isochronous packets to other switched nodes. Data buffers 46A–46D store the isochronous packets received from the bi-directional ports, the isochronous packets received from the adapter circuitry 56, and the isochronous packets comprising the asynchronous data. The routing circuitry 40 selects at least one of the bi-directional ports to output the stored isochronous packets, and stores a departure time parameter for each of the stored isochronous packets. The scheduler 50A–50D, responsive to the target arrival times and the departure times, schedules the transmission of the stored isochronous packets through at least one of the bi-directional ports.

In the embodiment of FIG. 10, the asynchronous-to-isochronous converter 58 comprises a microprocessor for reserving a path through the switched nodes 4 by reserving resources at each switched node, and for scheduling the transmission of an isochronous packet comprising data from an asynchronous packet.

The routing circuitry 40 at each switched node along the reserved path is programmed with the path ID and a deadline parameter specifying the maximum delay tolerable before the isochronous packet should be forwarded to the next switched node. The asynchronous-to-isochronous converter 58 also assigns an initial arrival time to the isochronous packet which may depend on the availability of the reserved path. Thus, the isochronous packet may be delayed initially until the reserved path has been established and is ready to begin the transmission.

In another embodiment, the microprocessor within the asynchronous-to-isochronous converter 58 schedules the transmission of the isochronous packet based on the activity of the switched node 4A". When the switched node 4A" is ready to transmit the isochronous packet, the isochronous packet is transmitted from the output port 54 associated with the adapter circuitry 56 to at least one of the data buffers 46A–46D where it is scheduled by scheduler 50A–50D for transmission to other switched nodes via the output ports 36A–36D.

In one embodiment, the isochronous switched fabric network comprises a suitable timing facility for establishing a time base with which to reserve bandwidth and schedule the transmission of the isochronous packets through the switched nodes 4. The time base may be established using any suitable technique. In one embodiment, a "cycle start" packet is periodically transmitted throughout the network (e.g., at a 8 kHz interval) to establish a time base similar to the IEEE 1394 protocol. Each of the switched nodes 4 are effectively synchronized to the "cycle start" packet and bandwidth is reserved with respect to the "cycle start" packet. In another embodiment, the isochronous data packets are transmitted in fixed-sized "frames" (e.g., 810 bytes every 125 microseconds) so that the frame itself establishes the time base similar to the Sonet/ATM protocol.

In one embodiment, the asynchronous-to-isochronous converter 58 within the switched node 4A" combines a number of sequential asynchronous packets having the same destination information into an isochronous stream comprising a plurality of isochronous data packets. A path is reserved through the switched nodes 4 for transmitting the stream, and the path is torn down once the stream has been transmitted. In another embodiment, a single large asynchronous packet is converted into a number of smaller isochronous packets and transmitted through the network as an isochronous stream.

In another embodiment, the switched node 4A" of FIG. 10 further comprises an isochronous-to-asynchronous converter for converting isochronous packets comprising asynchronous data into asynchronous packets for transmission by the adapter circuitry 56 to the external entity. The isochronous packets received from the input ports 34A–34D destined for the switched node 4A" are routed via multiplexers 44A–44B to the input port 52 associated with the adapter circuitry 56. In one embodiment, a microprocessor 58 within the switched node 4A" performs the isochronous-to-asynchronous conversion.

In another embodiment, the asynchronous-to-isochronous and isochronous-to-asynchronous conversion is performed by a central microprocessor, such as the microprocessor 6 of FIG. 1. When an asynchronous packet is received from a host initiator into buffers $12_0$–$12_N$, it is transmitted via line 25 to the microprocessor 6 which converts the asynchronous packet into an isochronous packet, reserves resources in a path through the switched nodes 4, and programs the routing circuitry 40 within each switch node with a path ID, routing information, and a deadline parameter. The microprocessor 6 then inserts the isochronous packet into the appropriate buffer $12_i$ via line 25 for routing through the switched nodes 4. For further details concerning the conversion of asynchronous packets into isochronous packets, and isochronous packets into asynchronous packets, see the above referenced patent application entitled "CONVERTING ASYNCHRONOUS PACKETS INTO ISOCHRONOUS PACKETS FOR TRANSMISSION THROUGH A MULTI-DIMENSIONAL SWITCHED FABRIC NETWORK".

We claim:

1. An isochronous switched fabric network comprising:
   (a) a plurality of interconnected switched nodes forming multiple dimensions, each switched node having multiple dimensions and comprising an upstream port and a downstream port for each dimension, each upstream and downstream port comprising an input port and an output port;

(b) a discovery facility for discovering a depth of each dimension, and for discovering resources within each switched node;

(c) an addressing facility, responsive to the discovery facility, for assigning a matrix address to each switched node;

(d) a resource reservation facility for reserving resources within each switched node to establish a path through the switched fabric network for transmitting an isochronous data stream; and (e) a scheduling facility for scheduling isochronous data transmitted through the switched fabric network.

2. The isochronous switched fabric network as recited in claim 1, wherein the discovery facility comprises a central processor.

3. The isochronous switched fabric network as recited in claim 2, wherein the central processor is attached to one of the switched nodes.

4. The switched fabric network as recited in claim 3, wherein:

(a) the switched nodes are connected in each dimension to form a loop;

(b) the central processor transmits an initialization packet through the output port of each downstream port to the input port of the corresponding upstream ports of adjacent switched nodes, thereby transmitting an initialization packet through each dimension;

(c) each switched node along each dimension modifies the initialization packet and forwards the initialization packet through the corresponding downstream port for the dimension; and (d) the central processor evaluates each initialization packet transmitted through each dimension to determine the depth of each dimension and to determine the resources within each switched node.

5. The switched fabric network as recited in claim 4, wherein:

(a) the initialization packet comprises a dimension node number (DNN) comprising a plurality of sub-fields;

(b) each sub-field represents one of the dimensions; and (c) each switched node along each dimension increments the corresponding sub-field within the DNN in the initialization packet.

6. The isochronous switched fabric network as recited in claim 1, wherein the discovery facility is distributed throughout the switched nodes.

7. The isochronous switched fabric network as recited in claim 6, wherein the discovery facility comprises a plurality of processors attached to the switched nodes.

8. The isochronous switched fabric network as recited in claim 6, wherein:

(a) the switched nodes are connected in each dimension to form a loop;

(b) an initialization packet comprising an initialization identification (ID) and an initialization dimension node number (DNN) is transmitted between the switched nodes of each dimension; and (c) each switched node further comprises:
a local ID;
a local DNN representing at least part of the matrix address for the switched node; and
a controller for comparing the initialization ID to the local ID and for modifying the local DNN and the initialization DNN in response to the comparison.

9. The switched fabric network as recited in claim 1, wherein the matrix address comprises a plurality of contiguous sub-fields corresponding to each dimension, each sub-field comprising a number of bits n where:

$$n=\text{round}(0.5+(\log(\text{dimension\_depth})/\log(2)))$$

where the dimension_depth is the depth of the dimension corresponding to the sub-field.

10. The switched fabric network as recited in claim 1, wherein:

(a) the resource reservation facility is distributed throughout the switched nodes; and (b) each switched node comprises a leasing facility for leasing idle resources to other switched nodes.

11. A method of transmitting data through an isochronous switched fabric network comprising a plurality of interconnected switched nodes forming multiple dimensions, each switched node having multiple dimensions and comprising an upstream port and a downstream port for each dimension, each upstream and downstream port comprising an input port and an output port, the method comprising the steps of:

(a) discovering a depth of each of the dimension and discovering resources within each switched node;

(b) assigning a matrix address to each of the switched node in response to the step of discovering a depth of each dimension;

(c) reserving resources within each of the switched node to establish a path through the switched fabric network for transmitting an isochronous data stream; and (d) scheduling isochronous data transmitted through the switched fabric network.

12. The method of transmitting data through an isochronous switched fabric network as recited in claim 11, wherein a central processor performs the discovery steps.

13. The method of transmitting data through an isochronous switched fabric network as recited in claim 12, wherein the central processor is attached to one of the switched nodes.

14. The method of transmitting data through an isochronous switched fabric network as recited in claim 13, wherein the switched nodes are connected in each dimension to form a loop, the method further comprises the steps of:

(a) the central microprocessor transmitting an initialization packet through the output port of each downstream port to the input port of the corresponding upstream ports of adjacent switched nodes, thereby transmitting an initialization packet through each dimension;

(b) modifying the initialization packet at each switched node and forwarding the initialization packet through the corresponding downstream port for the dimension; and (c) the central microprocessor evaluating each initialization packet transmitted through each dimension to determine the depth of each dimension and to determine the resources within each switched node.

15. The method of transmitting data through an isochronous switched fabric network as recited in claim 14, wherein:

(a) the initialization packet comprises a dimension node number (DNN) comprising a plurality of sub-fields;

(b) each sub-field represents one of the dimensions; and (c) each switched node along each dimension increments the corresponding sub-field within the DNN in the initialization packet.

16. The method of transmitting data through an isochronous switched fabric network as recited in claim 11, wherein the discovery step is distributed to the switched nodes.

17. The method of transmitting data through an isochronous switched fabric network as recited in claim 16, wherein the switched nodes are connected in each dimension to form a loop, each switched node comprises a local identification (ID) and a local dimension node number (DNN) representing at least part of the matrix address for the switched node, the method further comprises the steps of:

(a) transmitting an initialization packet comprising an initialization ID and an initialization dimension node number (DNN) between the switched nodes of each dimension; and (b) comparing the initialization ID to the local ID within each switched node and modifying the local DNN within each switched node and the initialization DNN in response to the comparison.

18. The method of transmitting data through an isochronous switched fabric network as recited in claim 11, wherein the matrix address comprises a plurality of contiguous sub-fields corresponding to each dimension, each sub-field comprising a number of bits n where:

$$n = \mathrm{round}(0.5 + (\log(\mathrm{dimension\_depth})/\log(2)))$$

where the dimension_depth is the depth of the dimension corresponding to the sub-field.

19. The method of transmitting data through an isochronous switched fabric network as recited in claim 11, further comprising the step of leasing idle resources within a first switched node to a second switched node.

* * * * *